United States Patent [19]
Arnarson et al.

[11] Patent Number: 5,184,733
[45] Date of Patent: Feb. 9, 1993

[54] APPARATUS AND METHOD FOR DETERMINING THE VOLUME, FORM AND WEIGHT OF OBJECTS

[75] Inventors: Hördur Arnarson, Reykjavik, Iceland; Louis F. Pau, Valbonne Cedex, France

[73] Assignee: Marel H.F., Reykjavik, Iceland

[21] Appl. No.: 837,318

[22] Filed: Feb. 19, 1992

[30] Foreign Application Priority Data

Feb. 19, 1991 [IS] Iceland .................................... 3676

[51] Int. Cl.⁵ ................................................. B07C 5/00
[52] U.S. Cl. ..................................... 209/585; 209/586; 209/939; 356/376; 356/379; 358/107
[58] Field of Search ............... 209/585, 586, 939, 576; 356/379, 376; 358/107

[56] References Cited

U.S. PATENT DOCUMENTS 4,493,420  1/1985  Dennis ................................ 209/939
4,693,607  9/1987  Conway .............................. 209/586

FOREIGN PATENT DOCUMENTS 0258810  3/1988  European Pat. Off. ............ 358/107

*Primary Examiner*—H. Grant Skaggs
*Attorney, Agent, or Firm*—Cushman, Darby & Cushman

[57] ABSTRACT

An apparatus and method for determining the volume, form and weight of fish or other objects is presented. A linescan camera records a top view of an object and at the same time records a profile view of the object reflected by a mirror located adjacent to the object. The mirror is positioned to reflect a view of the object which is perpendicular to the direct view of the camera and to the direction of motion of a conveyor belt along which the object moves. As the object moves along a conveyor belt through the field of view of the camera, a number of cross-sectional images are recorded and transmitted to a microprocessor. The microprocessor determines the maximum width of each cross-section from the direct image and the maximum thickness from each cross-section reflected image. Based upon the width and height of each cross-section and a form factor and estimated object density, the microprocessor calculates volume ane weight for each cross-section and adds the series of object cross-sections together to determine a volume and weight of the object.

26 Claims, 2 Drawing Sheets

APPARATUS AND METHOD FOR DETERMINING THE VOLUME, FORM AND WEIGHT OF OBJECTS

BACKGROUND OF THE INVENTION

1. Field of the Invention

This invention relates to a method and apparatus for determining volume, form and weight of an object, and more particularly, such a method and apparatus using a camera.

2. Description of the Related Art

In the processing of fish and other products it is necessary to grade and sort portions into various categories, both by form (i.e. whether they are tail portions, loins, center portions, etc.) and by weight. It is also sometimes convenient to grade fish fillets before they are portioned. At present, grading by form is carried out by hand, and then each portion is weighed. This method is time consuming and is subject to error. Grading by weight alone is of little value, because it does not provide information on the flesh distribution of the fish sufficient for further processing. By analyzing the form and the volume in addition to the weight of the product, significantly more information can be obtained and used in determining the further processing of the fish.

One technique which has frequently been applied to measure the three-dimensional form of objects is "structured lighting", in which a pattern of lines is projected onto the object at a particular angle and then examined from another angle with a camera. The application for patent of ISHIDA European Patent Application No. 85306694.2 provides one example of this technique. The principal disadvantage of the structured lighting measuring technique is that there must be a specific minimum distance between the lines which are projected onto the fish so that they do not overlap. A common interval is 2½ cm, i.e. 0.4 lines per cm, and it is seldom that more than 50 points along each line are measured, so that only 20 measuring points are obtained for each cm along an object. If the quantization error in structured lighting is examined, it is evident that the error is extremely large. For example, 50 cm is imaged with 256×256 pixels and there is an interval of 2½ cm between the lines which are projected onto the fish. Approximately 20 lines are therefore projected onto a fish, and the thickness along each line is measured by 13 pixels. Frequently, the thickness is measured with 5-10 pixels. It is therefore clear that there will be considerable error due to the low resolution of the method. Another substantial disadvantage of structured lighting is that a large amount of data must be processed: 256×256, or 65,536 measuring points, and extremely complex image analysis techniques are needed in order to determine the size and position of the fish on the basis of such data. This calculation intensive method results in a slow operation and limited accuracy.

SUMMARY OF THE INVENTION

The present invention provides method and apparatus for grading objects by form and size which is simpler, quicker, more accurate and cheaper than that which has been available up to now.

The present invention is an apparatus and method for determining the volume, form and weight of an object such as a piece of fish. The object is placed on a conveyor belt which moves beneath a special camera which takes simultaneous pictures of the thickness and width of the piece of fish, at specific regular intervals. The data from these pictures are then further processed by a computer, which, on the basis of particular assumptions, is able to indicate accurately the weight, form and volume of an object. This method and apparatus can perform independently of external movements, such as the motion of a ship at sea.

BRIEF DESCRIPTION OF THE DRAWINGS

The invention is described in greater detail below with reference to the appended drawings, in which.

DESCRIPTION OF THE PREFERRED EMBODIMENT

Figure 1:
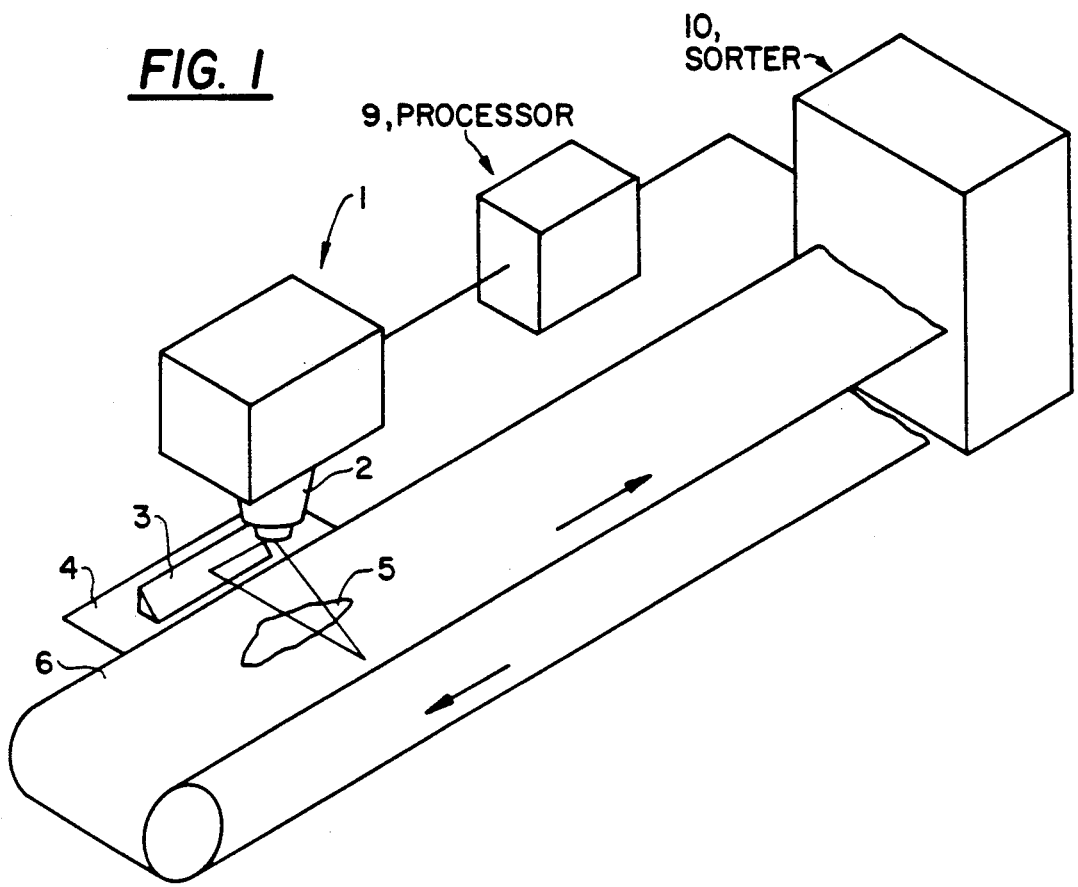
FIG. 1 shows a perspective view of the apparatus according to the present invention.

In the preferred embodiment of the present invention shown in FIG. 1, a linescan camera 1 located above and directed towards the surface of a conveyor belt 6 scans an object 5 traveling on the conveyor belt 6. The camera 1 takes a picture of the top of the object 5 and at the same time takes a picture of the lateral side of the object 5 with the aid of a mirror 3 positioned on a fixed support 4 at the side of the conveyor belt 6.

Figure 2:
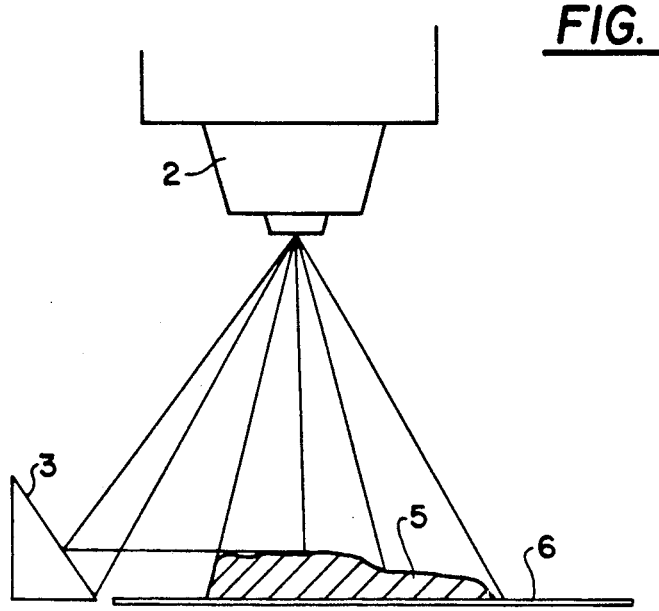
FIG. 2 shows a cross-sectional view of the camera apparatus according to the present invention.
Figure 4:
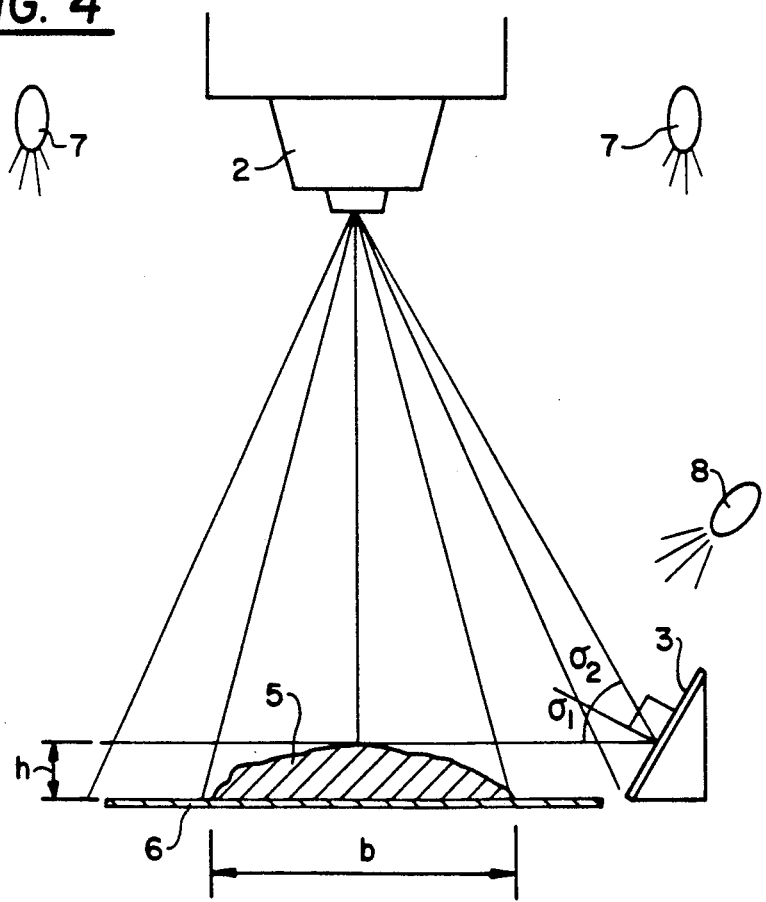
FIG. 4 is a cross-sectional view showing the position of the mirror of the apparatus according to the present invention.

FIG. 2 more clearly shows the arrangement of the camera 1, mirror 3 and object 5 on the conveyor belt 6. The mirror 3 is arranged so that a profile image of the object 5 is reflected by the mirror 3 up into the lens of the linescan camera 1. FIG. 4 illustrates the alignment of the mirror 3 with respect to the camera 1 and the conveyor belt 6. Also shown in FIG. 4 are the approximate positions of lamps 7 and 8 which illuminate the object to provide a clear image for the camera.

Figure 3:
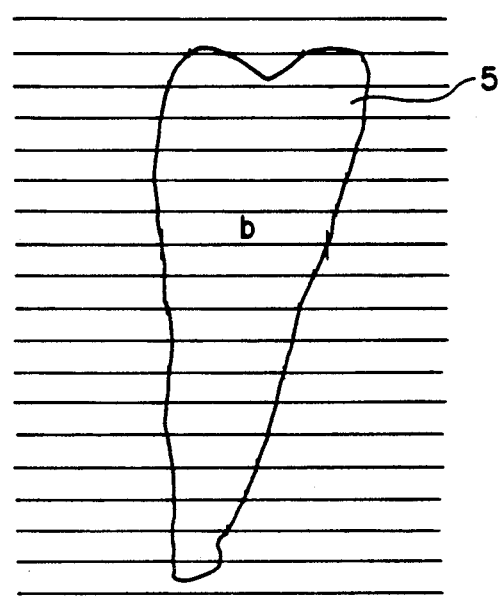
FIG. 3 shows a schematic view of the form of a fish fillet and a pattern of image lines according to the present invention.

Data of the recorded image is then transmitted to microprocessor 9 which analyzes the images and determines the weight, volume and form of the object. By means of this image, two quantities are measured by the microprocessor: the width (b) of the object and its thickness (h). Referring to FIG. 3, linescan camera (1) takes an image at intervals as the object passes under the camera on conveyor belt 6. The interval at which the camera 6 takes a picture and the speed of the conveyor belt determine the distance between locations at which cross-sections are determined. At each interval, the camera takes a picture, and the thickness (h) and width (b) of a cross-section of the object are determined by the microprocessor 9.

The composite image of the fish consists of many cross-sections, with the width and maximum thickness of the fish being measured in each cross-section.

The area of the cross-section (A) is determined by the microprocessor from the images from the camera. In each scanning line, the width (b) and maximum thickness (h) of the fish for each cross-section are measured, and then cross-sectional area A is obtained by the formula:

$$A = b \times h \times \beta$$

in which $\beta$ is a form factor. The value $\beta$ is determined by the type of fish or object, the orientation of the fish or object on the conveyor belt, and the estimated size of the fish or object.

The orientation of the cross-section is determined on the basis of data from both the direct and reflected images of the object. This applies to the orientation of the fish in terms of the direction of motion of the conveyor belt. Also, by using simple morphology, individual parts of the fish can be identified. The thickness profile also indicates what part of the fillet is being measured.

The volume (V) of the fish is obtained by adding together all of the sectional volumes (Vs) of the object. Sectional volumes (Vs) are obtained by multiplying the cross-sectional area (A) by the speed of the conveyor belt (v) and the time between readings of the scanning lines (T). This is done for each cross-section to obtain the sectional volume (Vs), and the sectional volumes (Vs) are then added to obtain the total volume (V) of the fish.

The weight of the fish is then obtained by multiplying volume (V) by the specific weight density of the type of fish being analyzed.

The microprocessor then takes the form, volume and weight information to control a conventional sorter 10, in a manner well known to those of ordinary skill in the art. The sorter then sorts the object based on instructions from the microprocessor.

The method and apparatus of the present invention provide a number of advantages over the method of structural lighting. The present invention provides greater accuracy because it measures at least 20 lines/cm, a line density 50 times that of structural lighting. As soon as the lines are sensed, three points are measured in each line. Two points are located at the edges of the cross-section, and one at the highest point of each cross-section. In this way at least 60 measuring points per cm are obtained. By combining the measurements with knowledge of the position of the cross-sections it is possible to obtain an accurate three-dimensional measurement of the form.

In contrast the accuracy of structured lighting is limited by the minimum distance between the lines which are projected onto the fish so that there is no overlap between the lines. A common distance is 2.5 cm, providing a maximum line density of 0.4 lines/cm. More than 50 points in each line are seldom measured, so that only 20 measuring points/cm are obtained. The resulting len resolution indicates the potential for significant error.

The present invention also has significantly greater speed than the method of structural lighting. Assuming there are 20 lines/cm in a 25-cm long object, 1500 measured points define the measured object and a great deal is known about the position of each measuring point. This requires only 500 cross-section calculations to determine the volume. In contrast, using structured lighting, the corresponding quantity of data consists of $256 \times 256$, or 65,536 measuring points. Also, extremely complex image analysis techniques are needed in order to determine the size and position of the fish.

Thus, the present invention is significantly more efficient than structural lighting, both because there is less data to be processed and because more is known about the data when calculation begins.

Although only a single preferred embodiment of this invention has been described, those skilled in the art will readily appreciate that many modifications are possible without material departing from the novel teachings and advantages of the invention. Accordingly all such modifications are intended to be included within the scope of this invention as defined by the followings claims.

What is claimed is:

1. An apparatus for assessing an object comprising:
   a camera positioned above and aimed at a surface of a conveyor belt to receive a direct image of the object;
   a mirror positioned along side and parallel with the conveyor belt at an angle to project a profile image of an object on the conveyor belt under the camera into a lens of the camera;
   means, connected to the camera, for determining at least one of the volume, form and weight of the object by combining the direct image of the object received by the camera and the profile image.

2. An apparatus according to claim 1 wherein the camera is a linescan camera.

3. An apparatus according to claim 2 wherein a series of images is taken at intervals.

4. An apparatus according to claim 3 wherein the determining means determines volume by determining cross-sectional area and sectional volume by combining speed conveyor and the interval between images and adding sectional volumes for the series of images.

5. An apparatus according to claim 4 wherein the determining means determines the cross-sectional area by combining a maximum height of profile image, width of the top plan image and a form factor of the object.

6. An apparatus according to claim 5 wherein at least one mirror surface is positioned in an image area of the camera such that the camera receives the profile image of the object from a direction at right angles to the top plan image received directly from the object and to a direction of movement of the conveyor belt.

7. An apparatus according to claim 6 wherein the mirror is positioned adjacent to the conveyor belt such that a line of intersection of a plane of the mirror and a plane of the conveyor belt is substantially parallel with a direction of movement of the conveyor belt and such that the plane of the mirror forms an angle with the plane of the conveyor belt allowing the camera to receive a reflected image of a part of the conveyor belt and simultaneously a direct image of the same part of the conveyor belt.

8. A method for assessing an object with an apparatus comprising:
   a camera located above and aimed at a conveyor belt;
   a mirror adjacent the conveyor belt positioned to reflect to the camera an image of an object on the conveyor belt; and
   a processor, connected to the camera for determining the volume form and weight of the object by combining a direct image of the object received directing by the camera and a reflected profile image;
   the method comprising the steps of:
   recording a direct image of an object traveling below the camera on the conveyor belt;
   recording a reflected image of an object traveling below the camera on the conveyor belt such that the direct image and reflected image are recorded simultaneously and the reflected image is from a direction at substantially right angles to the direction of the direct image and to a direction of movement of the conveyor belt;

transmitting the image data to the processor; and combining image data and other data including speed of the conveyor belt, a form factor and density of the object to determine at least one of the volume, weight and form of the object.

9. A method according to claim 8 wherein the steps of recording direct and reflected images are recording images with a linescan camera.

10. A method according to claim 9 wherein the steps of recording direct and reflected images are repeated at intervals to obtain a series of images.

11. A method according to claim 10 wherein the combining step includes the steps of determining the volume by determining cross-sectional area and sectional volume by combining the speed of the conveyor and an interval between images, and adding sectional volumes for the series of images.

12. A method according to claim 11 wherein the cross-sectional area determining step includes the step of combining a maximum height of the reflected image, width of the direct image and a form factor of the object.

13. A method according to claim 12 wherein the step of recording a reflected image is recording a reflected image from a direction parallel to a surface of the conveyor belt.

14. An apparatus for assessing an object comprising:
a camera positioned above and aimed at a surface of a conveyor belt to receive a direct image of the object;
a mirror positioned along side and parallel with the conveyor belt at an angle to project a profile image of an object on the conveyor belt under, the camera into a lens of the camera;
means, connected to the camera, for determining at least one of the volume, form and weight of the object by combining the direct image of the object received by the camera and the profile image; and
means for sorting objects on the basis of one or more of the volume, form and weight of the object determined by the determining means.

15. An apparatus according to claim 14 wherein the camera is a linescan camera.

16. An apparatus according to claim 15 wherein a series of images is taken at intervals.

17. An apparatus according to claim 16 wherein the determining means determines volume by determining cross-sectional area and sectional volume by combining speed conveyor and the interval between images and adding sectional volumes for the series of images.

18. An apparatus according to claim 17 wherein the determining means determines the cross-sectional area by combining a maximum height of the profile image, width of the direct image and a form factor of the object.

19. An apparatus according to claim 18 wherein at least one mirror surface is positioned in an image area of the camera such that the camera receives the profile image of the object from a direction at right angles to the top plan image received directly from the object and to a direction of movement of the conveyor belt.

20. An apparatus according to claim 19 wherein the mirror is positioned adjacent to the conveyor belt such that a line of intersection of a plane of the mirror and a plane of the conveyor belt is substantially parallel with a direction of movement of the conveyor belt and such that the plane of the mirror forms an angle with the plane of the conveyor belt allowing the camera to receive a reflected image of a part of the conveyor belt and simultaneously a direct image of the same part of the conveyor belt.

21. A method for assessing an object with an apparatus comprising:
a camera located above and aimed at a conveyor belt;
a mirror adjacent the conveyor belt positioned to reflect to the camera an image of an object on the conveyor belt; and
a processor, connected to the camera for determining the volume form and weight of the object by combining a direct image of the object receiving directing by the camera and a reflected profile image;
the method comprising the steps of:
recording a direct image of an object traveling below the camera on the conveyor belt;
recording a reflected image of an object traveling below the camera on the conveyor belt such that the direct image and reflected image are recorded simultaneously and the reflected image is from a direction at substantially right angles to the direction of the direct image and to a direction of movement of the conveyor belt;
transmitting the image data to the processor; and
combining image data and other data including speed of the conveyor belt, the form factor and density of the object to determine at least one of the volume, weight and form of the object; and
sorting object based on at least one of the volume, form and weight of the object determined in the combining steps.

22. A method according to claim 21 wherein the steps of recording direct and reflected images are recording images with a linescan camera.

23. A method according to claim 22 wherein the steps of recording direct and reflected images are repeated at intervals to obtain a series of images.

24. A method according to claim 23 wherein the combining step of includes the step of determining the volume by determining cross-sectional area and sectional volume by combining the speed of the conveyor and an interval between images, and adding sectional volumes for the series of images.

25. A method according to claim 24 wherein the cross-sectional area determining step includes the step of combining a maximum height of the reflected image and width of direct image and a form factor of the object.

26. A method according to claim 25 wherein the step of recording a reflected image is recording a reflected image from a direction parallel to a surface of the conveyor belt.

* * * * *